United States Patent
Lee et al.

(10) Patent No.: US 10,050,748 B2
(45) Date of Patent: Aug. 14, 2018

(54) METHOD FOR TRANSMISSION OF SYNCHRONIZATION SIGNAL IN A CLUSTER-TREE STRUCTURED WIRELESS COMMUNICATION SYSTEM

(71) Applicant: Seoul National University R&DB Foundation, Seoul (KR)

(72) Inventors: Yong Hwan Lee, Seoul (KR); Jin Seok Han, Gunpo-si (KR); Jae Seok Bang, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 31 days.

(21) Appl. No.: 15/431,988

(22) Filed: Feb. 14, 2017

(65) Prior Publication Data

US 2017/0251472 A1  Aug. 31, 2017

(30) Foreign Application Priority Data

Feb. 15, 2016 (KR) .................. 10-2016-0016934

(51) Int. Cl.
*H04L 1/18* (2006.01)
*H04W 56/00* (2009.01)
*H04W 84/18* (2009.01)

(52) U.S. Cl.
CPC ....... *H04L 1/1867* (2013.01); *H04W 56/0015* (2013.01); *H04W 84/18* (2013.01); *Y02D 70/142* (2018.01); *Y02D 70/144* (2018.01)

(58) Field of Classification Search
CPC .................. H04L 1/1867; H04W 56/0015
See application file for complete search history.

(56) References Cited

U.S. PATENT DOCUMENTS

2006/0068704 A1* 3/2006 Bhakta .................. G06Q 30/02
455/41.2

FOREIGN PATENT DOCUMENTS

KR       101481867 B1    1/2015
KR     1020160004477 A   1/2016

OTHER PUBLICATIONS

IEEE Computer Society; Part 15.4: Wireless Medium Access Control (MAC) and Physical Layer (PHY) Specifications for Low-Rate Wireless Personal Area Networks (WPANs); IEEE Std 802.15.4-2006; Sep. 8, 2006; pp. 1-323; IEEE; New York; USA.
IEEE Computer Society; Part 15.4: Low-Rate Wireless Personal Area Networks (LR-WPANs) Amendment 1: MAC sublayer; IEEE Std 802.15.4e-2012; Apr. 16, 2012; pp. 1-225; IEEE; New York; USA.

\* cited by examiner

*Primary Examiner* — Ronald B Abelson
(74) *Attorney, Agent, or Firm* — The Webb Law Firm

(57) ABSTRACT

Provided is a method of transmitting, by a cluster head (CH), a synchronization signal at each transmission frame in a wireless communication system, where a plurality of cluster networks each including a CH and its devices connected to the CH form a cluster-tree structured network, and each of the plurality of cluster networks synchronously transmits and receives a signal by using a periodic transmission frame comprising a synchronization signal transmitting interval, a data signal transmitting interval, and an idle interval in which no signal is transmitted.

4 Claims, 11 Drawing Sheets

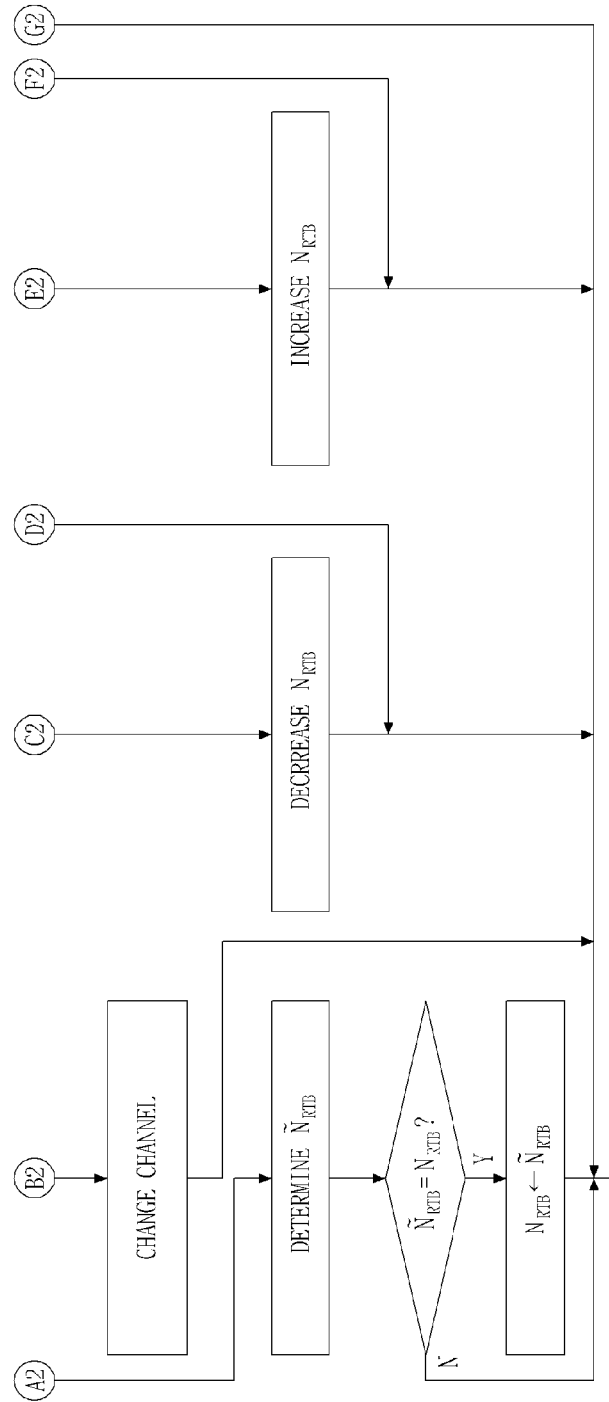

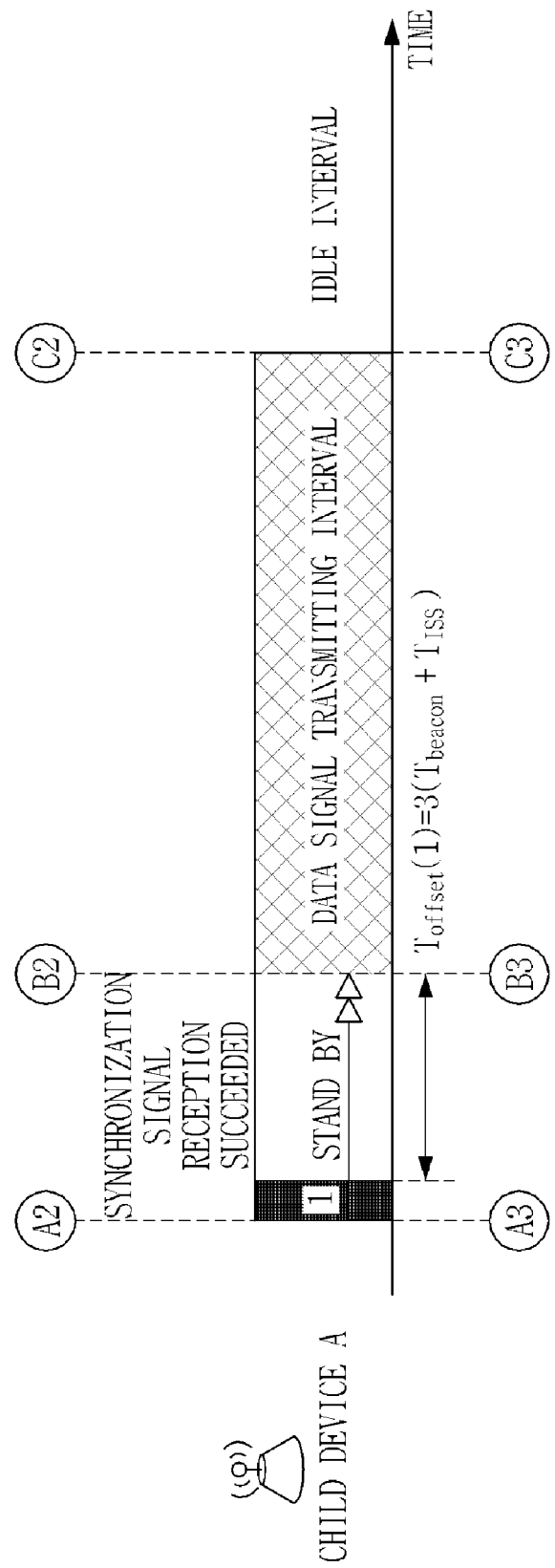

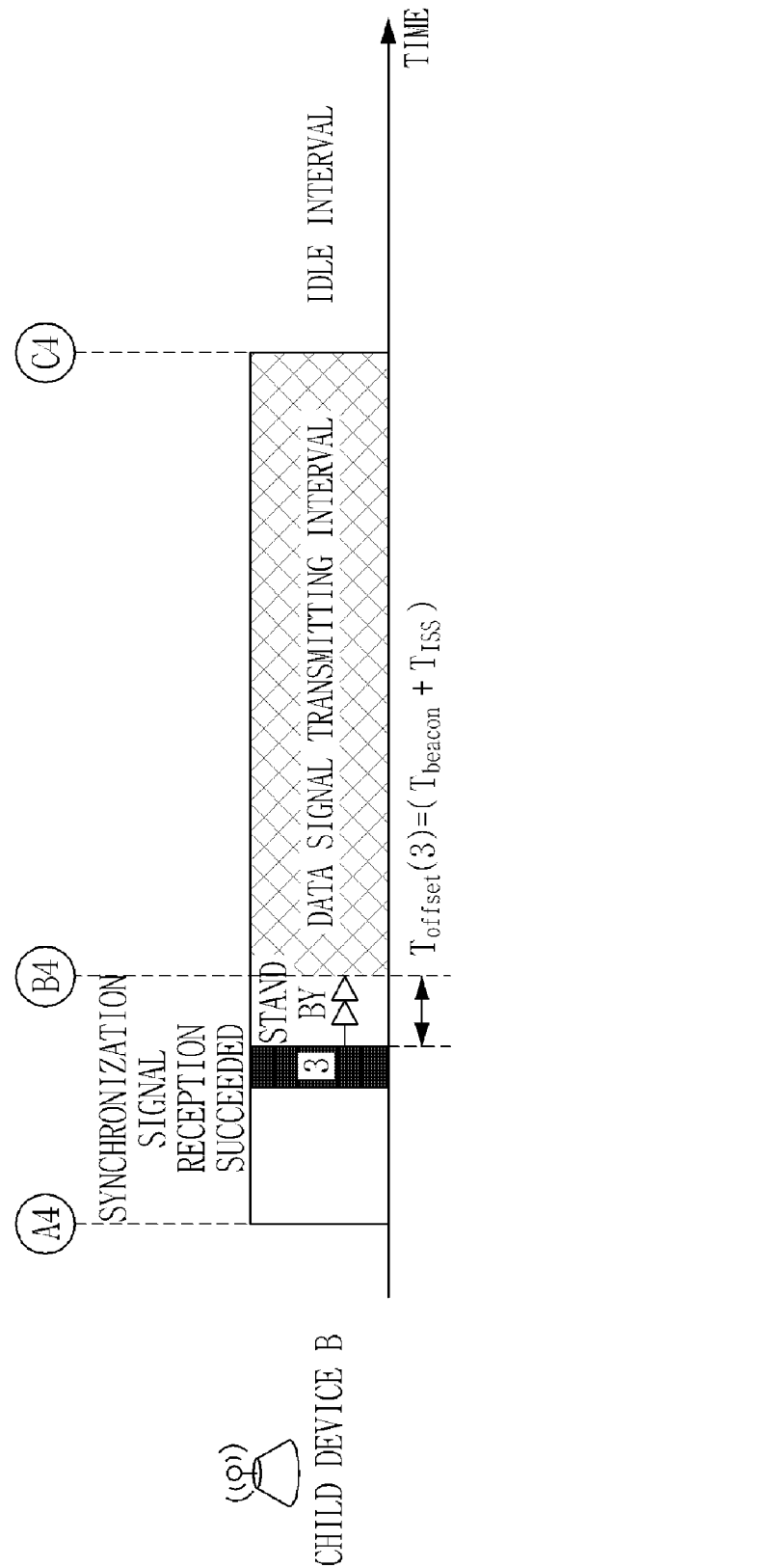

METHOD FOR TRANSMISSION OF SYNCHRONIZATION SIGNAL IN A CLUSTER-TREE STRUCTURED WIRELESS COMMUNICATION SYSTEM

CROSS-REFERENCE TO RELATED APPLICATION

This application claims priority to Korean Patent Application No. 10-2016-0016934 filed Feb. 15, 2016, the disclosure of which is hereby incorporated in its entirety by reference.

BACKGROUND OF THE INVENTION

Field of the Invention

The present invention relates to a method of signal transmitting, by each cluster head, a synchronization signal at each transmission frame in a cluster-tree structured wireless communication system.

Description of Related Art

In a wireless sensor network (WSN), since each sensor device may use a limited power source, such as a battery, a communication technology reducing power consumption is necessary. For example, in IEEE 802.15.4 that is a type of WSN medium access control (MAC) method, power consumption may be reduced by enabling devices in a system to transmit and receive a signal only in an interval for transmitting data signal, referred to a DATA interval, and stopping the devices from operating in a following idle interval, referred to an IDLE interval, by using a beacon-enabled mode that uses a periodic transmission frame including an interval for transmitting a synchronization signal, referred to a SYNC interval, the DATA interval, and the IDLE interval. Here, a synchronization signal, referred to a beacon signal, is periodically transmitted for synchronization of the transmission frame between the devices in the WSN.

When a plurality of wireless communication systems of different types or same type, which share the same frequency band, exist, a direct sequence spread spectrum (DSSS) system reduces an effect of interference signal within a band with the aid of spread spectrum technology. For example, in IEEE 802.15.4 that is a type of the DSSS system, a transmission signal may be spread and transmitted so as to obtain a processing gain with respect to interference signals. However, the performance of IEEE 802.15.4 DSSS may not be effective when a frequency-static interference signal occurring for a relatively long time in a wide frequency band, such as a wireless local area network (WLAN), exists. In detail, in the beacon-enabled mode of IEEE 802.15.4, since the beacon signal is transmitted once at each transmission frame, when an interference signal exists in a channel being in use, a transmission performance of the beacon signal may remarkably deteriorate and thus network devices experience severe power consumption and performance degradation due to repeated attempts to receive a beacon signal. When a network device does not consecutively receive a beacon signal, it may lose synchronization with its access point (AP), determining itself as an orphan device. In the presence of interference signal, network connectivity may seriously deteriorate in the beacon-enabled mode of IEEE 802.15.4.

In order to prevent such problems of the beacon-enabled mode of IEEE 802.15.4, IEEE 802.15.4e MAC enhancement uses a deferred beacon method (DBM) that is a method for transmitting a synchronization signal with an aid of channel sensing. In the DBM, an AP performs channel sensing before transmitting its synchronization signal. The AP transmits its synchronization signal only when it confirms that a channel is not being used, alleviating a collision between its synchronization signal and an interference signal. However, since DBM depends only on the channel sensing of the AP, its performance may significantly deteriorate in a hidden node environment where only network devices are affected by interference signal. Also, since a beacon signal is transmitted only once at each transmission frame, the performance improvement may be marginal in severe interference environments.

In order to solve such problems of existing techniques, a method of repeatedly transmitting a synchronization signal has been suggested (KR 10-1481867). According to the method, an AP and network devices may determine the number of repeated transmissions of the synchronization signal in consideration of estimated channel characteristics and target transmission performance of the system, and the AP repeatedly transmits its synchronization signal, improving the synchronization performance of its network devices. However, according to the method, since the AP and the network devices perform a channel scan to estimate channel characteristics, power consumption by the network devices may increase. Also, according to the method, since the channel scan is always performed before the number of repeated transmissions of the synchronization signal is adjusted, power consumption by the network devices can be large. Lastly, according to the method, since a time interval for the channel scan is not accurately designed, a signal of the network devices existing in the same network may be mistaken as an interference signal, and thus the channel characteristics may incorrectly be estimated. Accordingly, when the method is applied to a cluster-tree structured multi-hop wireless communication network, the number of repeated transmissions of the synchronization signal may be excessively high and a channel hand-off may frequently be performed.

SUMMARY OF THE INVENTION

One or more embodiments of the present invention include a method for transmission of a synchronization signal in the presence of interference signal from the same or different type of communication systems using a same frequency band, in a cluster-tree structured wireless communication system.

Additional aspects will be set forth in part in the description which follows and, in part, will be apparent from the description, or may be learned by practice of the presented embodiments.

According to one or more embodiments of the present invention, a signal transmission method in a wireless communication system comprising a main communication device, referred to an access point (AP), that manages network operation, routers that can have their child devices, and end devices that cannot have their child devices, where the AP and each router may operate as a cluster head (CH), a CH and its child devices form a cluster network, the wireless communication system is formed in a multi-hop cluster-tree structure in which a plurality of the cluster networks are connected to each other in a tree structure, and the CH transmits a synchronization signal at the beginning of each transmission frame so as to transmit and receive a signal by using a periodic transmission frame comprising a synchronization signal transmitting interval, referred to a SYNC interval, a data signal transmitting interval, referred to a DATA interval, and an idle interval in which no signal is transmitted, referred to an IDLE interval, the signal transmission method includes: determining, by the CH, whether a channel scan is required or not based on performance of signal transmission with its child devices; when it is determined that the channel scan is required, estimating, by the CH, characteristics of interference signal by performing the channel scan in the IDLE interval and determining whether to use the same channel as being in use to transmit the synchronization signal or not; and depending on a decision whether the channel scan is required or not and the channel being in use is used or not, repeatedly transmitting, by the CH, the synchronization signal by taking into consideration of the performance of signal transmission with its child devices, the estimated characteristics of interference signal, and target transmission performance of the wireless communication system.

The determining of whether the channel scan is required may include: determining, by the CH, that the channel scan is required when transmission errors occur in signal transmission from its child devices more than a predetermined number of times or when the CH does not receive an acknowledgement (ACK) signal from its child device as a response to a successful signal transmission to the child device more than a predetermined number of times; requesting, by the child devices, its CH to perform the channel scan when transmission errors occur in signal transmission from its CH more than a predetermined number of times or when the child device does not receive an ACK signal from its CH as a response to a successful signal transmission to the CH more than a predetermined number of times; and determining, by the CH, that the channel scan is required when it receives a request for the channel scan from its child device.

The estimating of the characteristics of interference signal and the determining of whether to use the same channel as being in use may include: estimating, by the CH, a ratio $\hat{\mu}(=N_D/N_S)$ as a characteristic of interference signal when it detects the presence of interference signal $N_D$ times after repeatedly performing the channel sensing $N_S$ times in an IDLE interval in which none of cluster networks in the system transmits a signal; and determining, by the CH, to repeatedly transmit the synchronization signal through the same channel as being in use if it determines that the target transmission performance is achievable by using the same channel being in use by taking into consideration of the estimated characteristic of interference signal and the received signal strength, and to transmit the synchronization signal through a different channel if not.

The repeated transmission of the synchronization signal may include: when it is determined to use the same channel as being in use, determining, by the CH, the number of repeated transmissions of the synchronization signal, referred to $N_{sync}$, by a smallest integer n that yields a transmission failure rate of repeated n transmissions of the synchronization signal, referred to $\hat{p}_e(n,\mu)$, lower than a predetermined threshold level when the estimated characteristic of interference signal is $\hat{\mu}$; when it is determined to change the channel, determining, by the CH, the number $N_{sync}$ by a smallest integer n that yields a transmission failure rate of repeated n transmissions of the synchronization signal through a channel being in use lower than a predetermined threshold level, or simply by a pre-fixed number $N_{sync}^{handoff}$ without any processing; when it is determined that the channel scan is not required, if it successfully receives data signals from its child devices more than a predetermined number of times, increasing, by the CH, a counter $n_{good}$ by one, resetting $n_{good}$ to zero if $n_{good}$ equals to a predetermined threshold level, and decreasing the number $N_{sync}$ if $N_{sync}$ is larger than a predetermined threshold level, and if it successfully receives data signals from its child devices less than a predetermined number of times, increasing, by the CH, a counter $n_{bad}$ by one, resetting $n_{bad}$ to zero if $n_{bad}$ equals to a predetermined threshold level, and increasing the number $N_{sync}$ if $N_{sync}$ is less than a predetermined threshold level; transmitting, by the CH, an $i^{th}$ synchronization signal including the number i, a time duration of a synchronization signal, referred to $T_{beacon}$, and the number $N_{sync}$, where $1 \leq i \leq N_{sync}$; and when a child device successfully receives the $i^{th}$ synchronization signal, beginning, by the child device, the transmission of a data signal after waiting for a time interval of $\hat{T}_{offset}=(N_{sync}-i)(T_{beacon}+T_{ISS})$ until its CH completes the transmission of the synchronization signal $N_{sync}$ times, where $T_{ISS}$ is a time interval between the two consecutive transmissions of the synchronization signal.

According to one or more embodiments of the present invention, a cluster head (CH) determines whether a channel scan is required or not in a distributed manner by estimating performance of signal transmission with its child devices. When the CH determines that the channel scan is required, it estimates the characteristics of interference signal by performing the channel scan in an IDLE interval in which none of cluster networks in the system transmits a signal, and determines the number of repeated transmissions of the synchronization signal in consideration of the estimated channel characteristics and target transmission performance of the wireless communication system. Even when the CH determines that the channel scan is not required, it estimates the performance of signal transmission with its child devices and adjusts the number of repeated transmissions of the synchronization signal, and thus the CH has power efficiency more excellent than existing techniques.

BRIEF DESCRIPTION OF THE DRAWINGS

The above and other objects, features and other advantages of the present invention will be more clearly understood from the following detailed description taken in conjunction with the accompanying drawings, in which:

FIGS. 5A and 5B is a flowchart of processes of a CH determining the number of repeated transmissions of the synchronization signal, according to an embodiment of the present invention, wherein nodes A1, B1, C1, D1, E1, F1, and G1 of FIG. 5A are connected to nodes A2, B2, C2, D2, E2, F2, and G2 of FIG. 5B respectively; and FIGS. 6A, 6B, and 6C is a diagram for describing processes of devices in a cluster repeatedly exchanging a synchronization signal, according to an embodiment of the present invention, wherein times A1, B1, and C1 in FIG. 6A correspond to times A2, B2, and C2 in FIG. 6B respectively, and times A3, B3, and C3 in FIG. 6B correspond to times A4, B6, and C4 in FIG. 6C respectively.

DESCRIPTION OF THE INVENTION

Hereinbelow, exemplary embodiments of the present invention will be described in detail with reference to the accompanying drawings. In the description of the present invention, certain detailed explanations are omitted when it is deemed that they may unnecessarily obscure the essence of the invention. All terms which are used herein should be construed as having meanings that are obvious to one of ordinary skill in the art. However, the terms may have different meanings according to an intention of one of ordinary skill in the art, precedent cases, or the appearance of new technologies. Thus, the terms used herein have to be defined based on the meaning of the terms together with the description throughout the specification.

Hereinafter, 'CH' denotes a cluster head.

Figure 1:
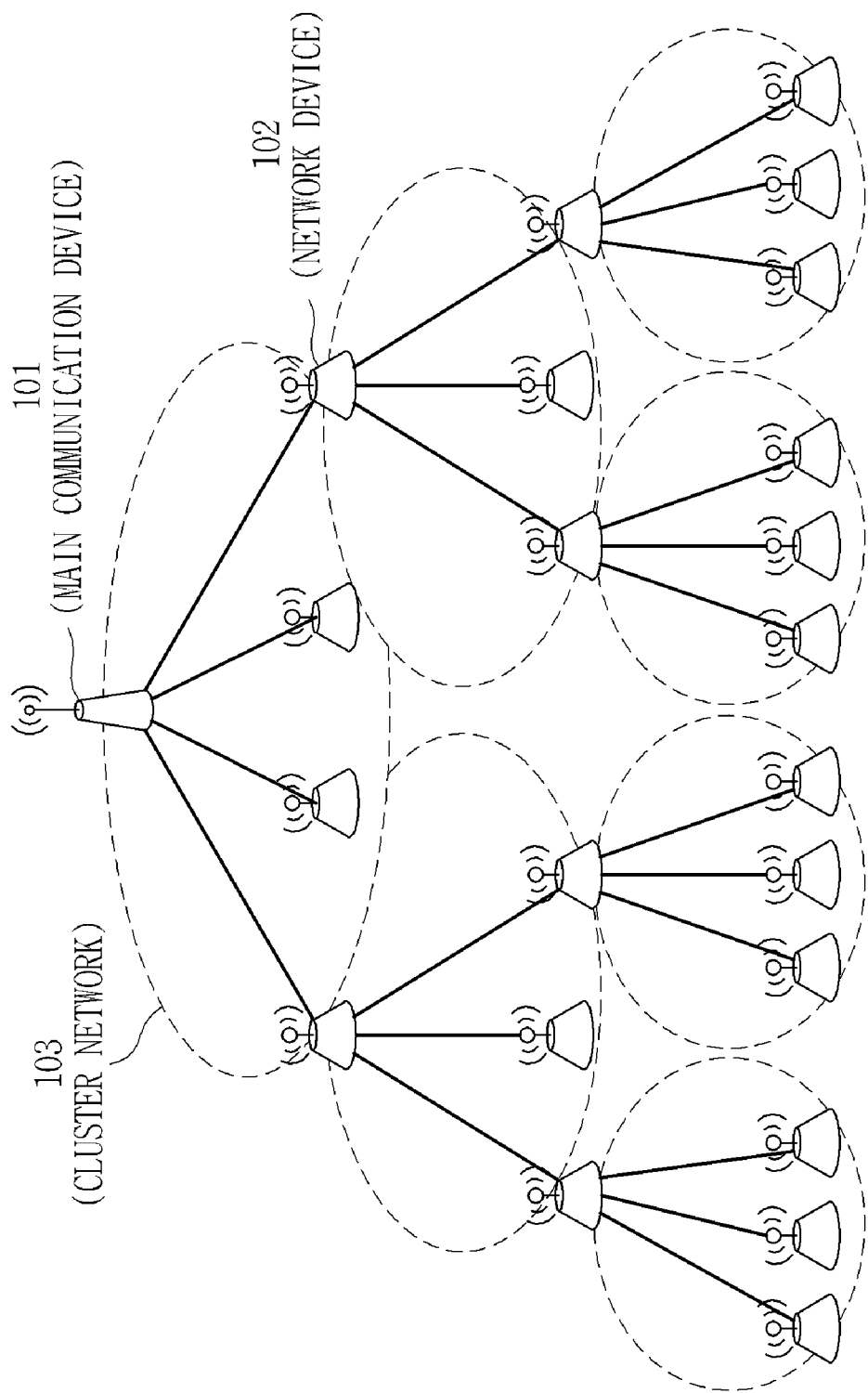
FIG. 1 is a diagram of a cluster-tree structured wireless communication system including one access point (AP) and a plurality of network devices, according to an embodiment of the present invention.
Figure 2:
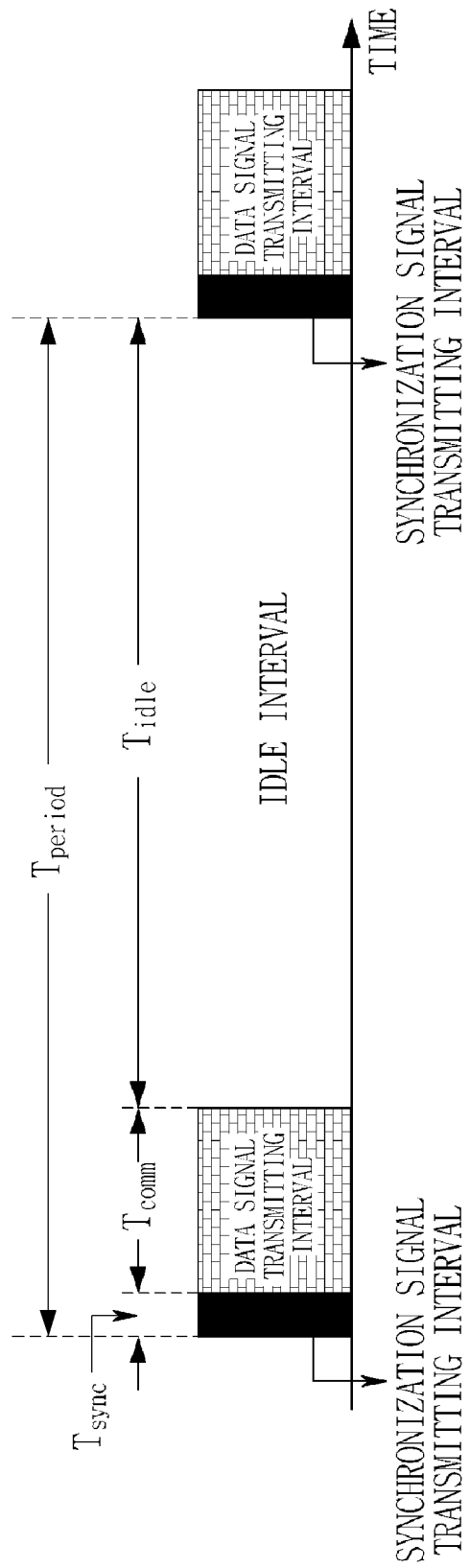
FIG. 2 is a diagram for describing a transmission frame according to an embodiment of the present invention.

For convenience of description, a cluster-tree structured wireless communication system including one main communication device, referred to an access point (AP), 101 that manages the wireless communication system, and a plurality of network devices 102 as shown in FIG. 1 is used. The network devices 102 may be classified into a router that can have its child devices and an end device that cannot have its child devices. The AP 101 and each router may operate as a CH, where a CH and its child devices form a cluster network 103. Each cluster network 103 synchronously transmits and receives a signal by using a periodic transmission frame having a structure as shown in FIG. 2, in one of a plurality of available communication channels. The transmission frame comprises an interval for transmitting a synchronization signal, referred to a SYNC interval, an interval for transmitting a data signal, referred to a DATA interval, and an interval in which no data signal is transmitted, referred to an IDLE interval. A unit length of the transmission frame, referred to $T_{period}$, may be represented according to Equation 1.

$$T_{period} = T_{sync} + T_{comm} + T_{idle} \quad \text{[Equation 1]}$$

Here, $T_{sync}$, $T_{comm}$, and $T_{idle}$ respectively denote a time interval of the SYNC interval, the DATA interval, and the IDLE interval. When $T_{beacon}$ denotes a time duration of the synchronization signal, $T_{sync} = T_{beacon}$ in FIG. 2.

The CH synchronizes with its child devices by periodically transmitting the synchronization signal. A child device turns on its receiver at time just before synchronization signal is expected to be transmitted, enabling to receive the synchronization signal transmitted from its CH. When the child device does not receive the synchronization signal, it determines that it fails the synchronization with its CH. When the child device does not consecutively receive the synchronization signal more than a predetermined number of times, it determines itself as an orphan device and may perform network re-association process.

Figure 3:
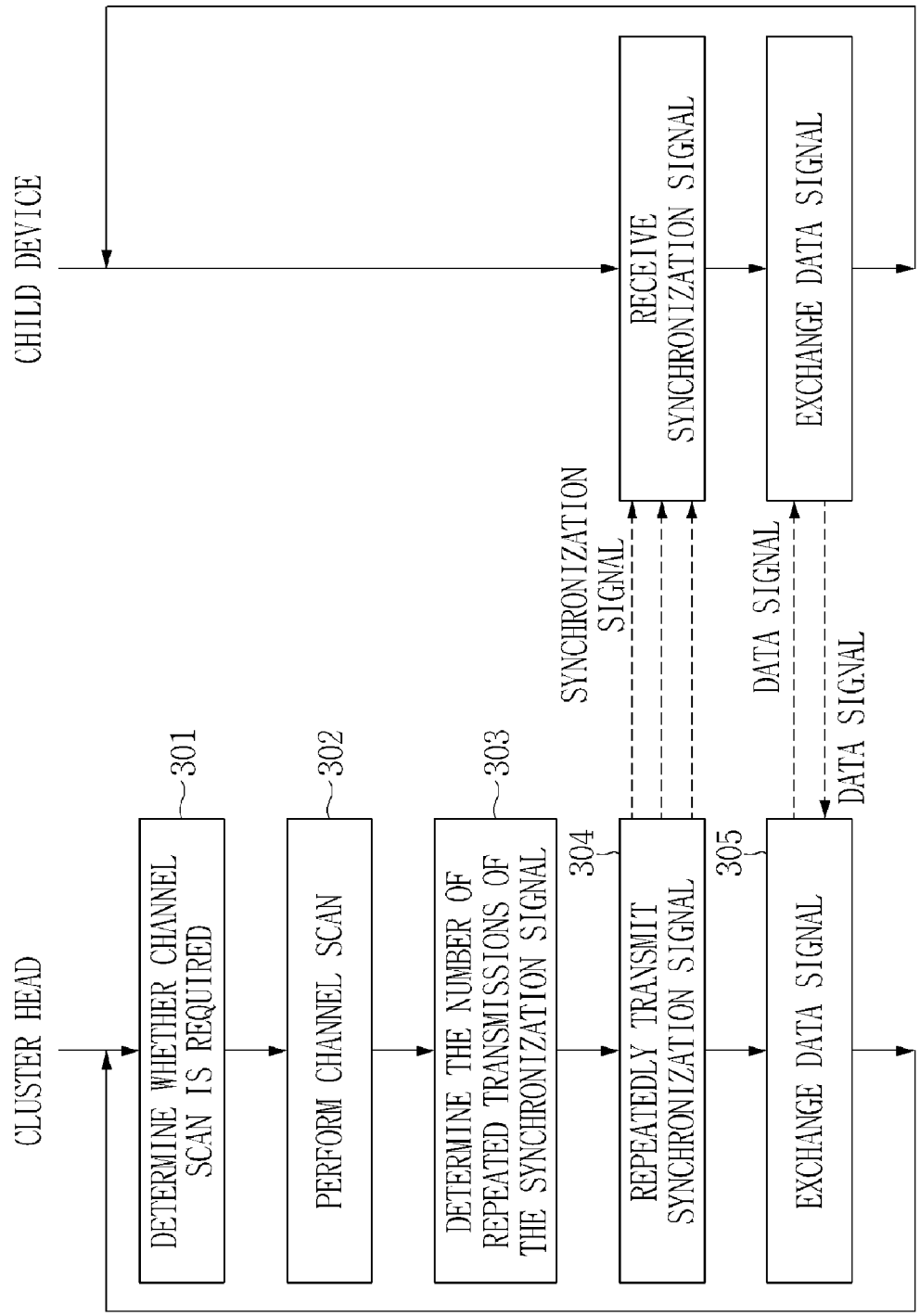
FIG. 3 is a flowchart of a method of signal transmission according to an embodiment of the present invention.

FIG. 3 is a flowchart of a method of signal transmission according to an embodiment of the present invention. Each CH determines whether a channel scan is required or not by estimating performance of signal transmission with its child devices in operation 301. When the CH determines that the channel scan is required, it estimates characteristics of interference signal by performing the channel scan in an IDLE interval in operation 302, and determines the number of repeated transmissions of the synchronization signal, referred to $N_{sync}$, by taking into consideration of the estimated characteristics of interference signal and target transmission performance of the wireless communication system in operation 303. When the CH determines that the channel scan is not required in operation 301, it determines the number $N_{sync}$ by estimating the performance of signal transmission with its child devices in operation 303. The CH repeatedly transmits the synchronization signal a determined number of times in operation 304, improving synchronization performance of its child devices. In operation 305, the CH and its child devices that successfully received the synchronization signal exchange data signal in the DATA interval.

Processes of determining, by the CH, whether the channel scan is required in operation 301, according to an embodiment, are as follows. The CH determines that the channel scan is required when transmission errors occur in signal transmission from its child devices more than a predetermined number of times or when the CH does not receive an acknowledgement (ACK) signal from its child device as a response to a successful signal transmission to the child device more than a predetermined number of times. Child devices request its CH to perform the channel scan when transmission errors occur in signal transmission from its CH more than a predetermined number of times or when the child device does not receive an ACK signal from its CH as a response to a successful signal transmission to the CH more than a predetermined number of times. The CH determines that the channel scan is required when it receives a request for the channel scan from its child device.

Figure 4A:
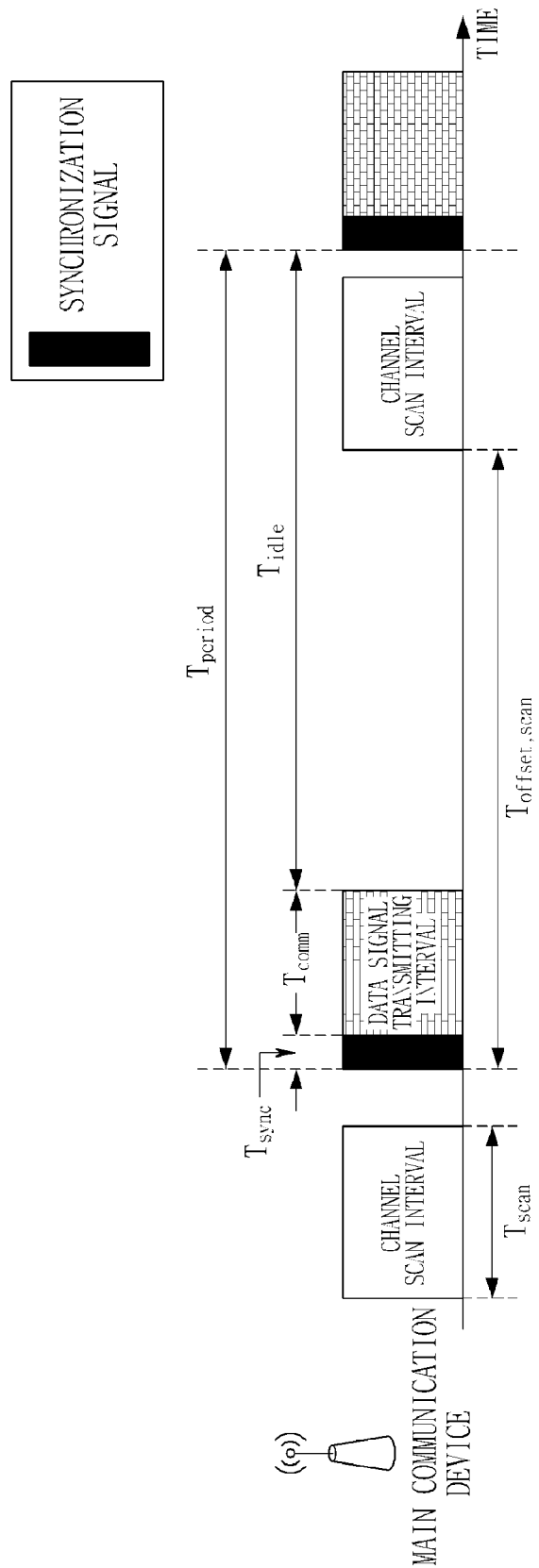
FIGS. 4A, 4B, and 4C are diagrams for describing processes of a cluster head (CH) performing a channel scan, according to an embodiment of the present invention.
Figure 4B:
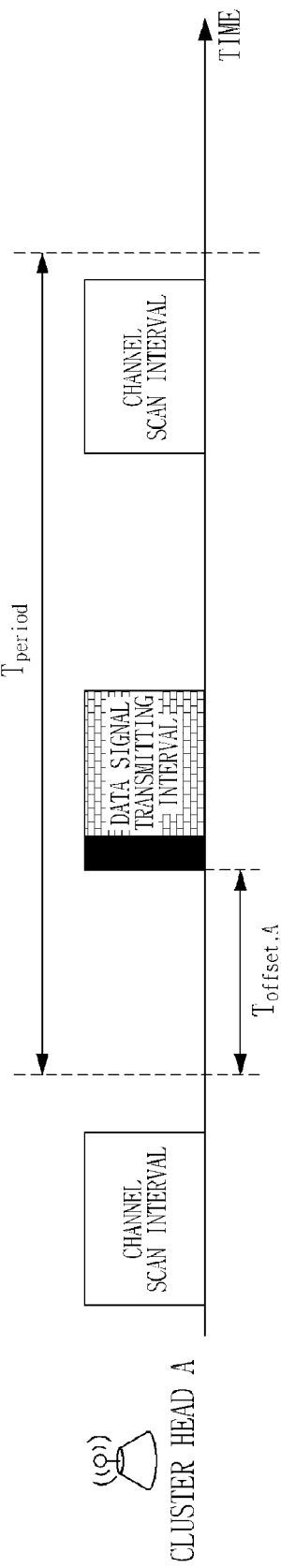
Figure 4C:
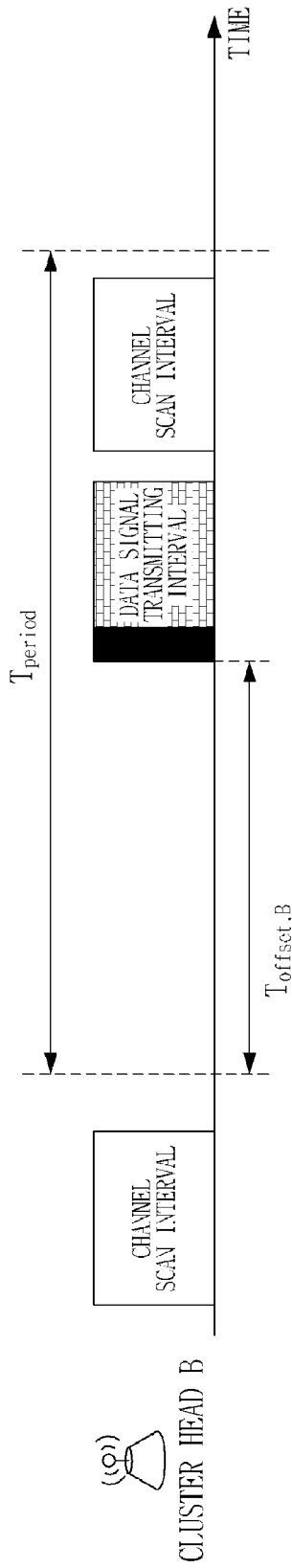

Processes of performing, by the CH, the channel scan in operation 302, according to an embodiment, when it is determined that the channel scan is required in operation 301, are as follows. The CH determines an interval for performing the channel scan in the IDLE interval. For example, a 'common idle period', in which no cluster network in the system transmits or receives a signal, can be predetermined as shown in FIGS. 4A, 4B, and 4C. The CH may estimate the characteristics of interference signal in a channel being in use, by means of a conventional channel sensing method such as an energy detection during the determined common idle period. For example, the CH may perform the channel sensing to estimate a channel occupancy ratio of interference signal according to Equation 2.

$$\hat{\mu} = \frac{1}{N_S} \sum_{i=1}^{N_S} u(P_i - \lambda_S) \quad \text{[Equation 2]}$$

Here, $u(\bullet)$ denotes a unit step function, $P_i$ denotes a power of signal received during an $i^{th}$ channel sensing, $\lambda_S$ denotes a threshold value for confirming the presence of interference signal, and $N_S$ denotes the total number of times the channel sensing is performed. A time duration of interference signal may be estimated according to Equation 3, based on the channel sensing.

$$\hat{T} = n_{S,max} T_S \quad \text{[Equation 3]}$$

Here, $n_{S,max}$ denotes a maximum number of times interference signal is consecutively detected and $T_S$ denotes a time interval for the channel sensing. For example, when $N_S = 10$ and $T_S = 320$ us, and the result of the channel sensing is {O, X, X, O, O, O, X, X, X, X}, where "O" and "X" denote the presence and the absence of interference signal, respectively, the channel occupancy ratio of interference signal is estimated by 0.4 (=4/10) and the time duration of interference signal is estimated by 960 us (=3×320 us).

Processes of determining, by the CH, the number of repeated transmissions of the synchronization signal, i.e., $N_{sync}$, in operation 303, according to an embodiment, are as follows. The CH determines the number $N_{sync}$ by taking into consideration of the characteristic of interference signal estimated in operation 302 and the target transmission performance of the wireless communication system. When it is assumed that an idle period of interference signal follows an exponential distribution and that the synchronization signal is transmitted only once as in IEEE 802.15.4 beacon-enabled mode, a transmission failure rate of the synchronization signal may be estimated according to Equation 4.

$$p_e = 1 - (1-\mu)e^{-\frac{\mu}{1-\mu} \cdot \frac{T_{beacon}}{T}}$$ [Equation 4]

Here, $\mu$ denotes a channel occupancy ratio of interference signal, and T denotes a time duration of interference signal.

When it is assumed that the two consecutive transmissions of the synchronization signal are statistically independent of each other, a transmission failure rate of repeated n transmissions of the synchronization signal, i.e., a probability that a child device does not receive all n synchronization signals, may be estimated according to Equation 5.

$$p_e(n) = 1 - (1-p_e)^n = 1 - \left\{(1-\mu)e^{-\frac{\mu}{1-\mu} \cdot \frac{T_{beacon}}{T}}\right\}^n$$ [Equation 5]

Here, the number of repeated transmissions of the synchronization signal is determined according to Equation 6 to achieve a desired probability $\tilde{p}_e$ and a desired time interval of remaining DATA interval $\tilde{T}_{comm}$.

$$N_{sync}(\mu) = \min n,$$ [Equation 6]

subject to $\hat{p}_e(n,\mu) \leq \tilde{p}_e$ and $T_{comm} - (n-1)(T_{beacon} + T_{ISS}) > \tilde{T}_{comm}$ Here, $T_{ISS}$ denotes a time interval between the two consecutive transmissions of the synchronization signal, and $\hat{p}_e(n,\mu)$ denotes an estimated transmission failure rate of repeated n transmissions of the synchronization signal when the channel occupancy ratio of interference signal is $\mu$, and it is calculated according to Equation 7 by using the estimated value $\hat{\mu}$.

$$\hat{p}_e(n,\mu) = 1 - \left\{(1-\hat{\mu})e^{-\frac{\hat{\mu}}{1-\hat{\mu}} \cdot \frac{T_{beacon}}{T}}\right\}^n$$ [Equation 7]

When the number n that satisfies the condition in Equation 6 does not exist, the CH confirms the presence of severe interference in the channel being in use, and may initiate a channel hand-off by means of a conventional channel hand-off method. According to an embodiment, when the CH determines that a channel hand-off is required, it changes a channel while maintaining synchronization with its child devices by periodically generating the synchronization signal as being usual. During this interval, a reliability of the channel hand-off may greatly be improved by repeatedly transmitting the synchronization signal.

Figure 5A:
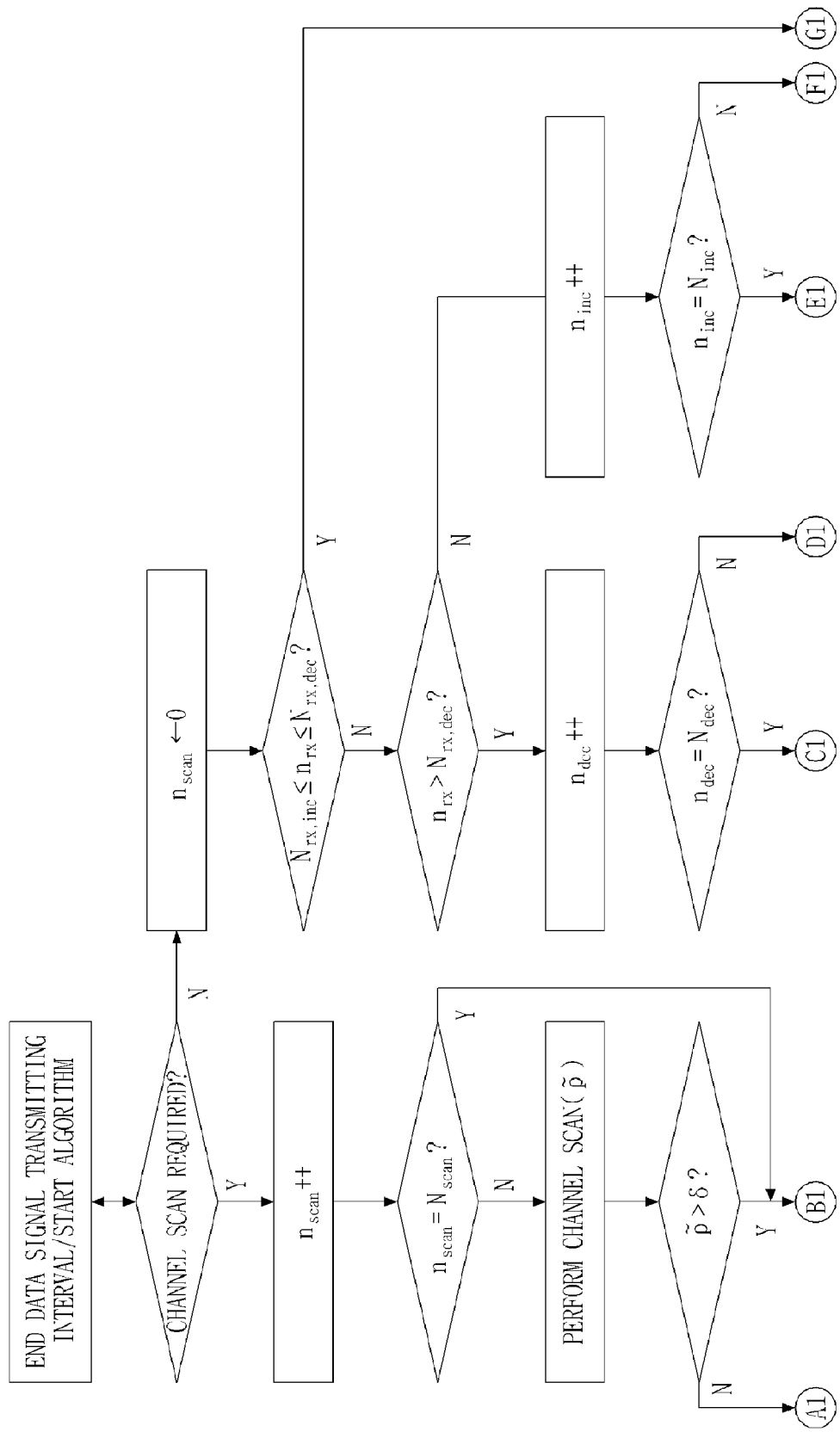

Processes of determining, by the CH, the number of repeated transmissions of the synchronization signal, $N_{sync}$, in operation 303, according to an embodiment, when it is determined that the channel scan is not required in operation 301, are as follows. If the CH successfully receives data signals from its child devices more than a predetermined number of times, it increases a counter $n_{good}$ by one. When the counter $n_{good}$ equals to a predetermined threshold level, the CH resets the counter $n_{good}$ to zero and decreases the number $N_{sync}$ if $N_{sync}$ is larger than a predetermined threshold level. If the CH successfully receives data signals from its child devices less than a predetermined number of times, the CH increases a counter $n_{bad}$ by one. When the counter $n_{bad}$ equals to a predetermined threshold level, the CH resets the counter $n_{bad}$ to zero and increases the number $N_{sync}$ if $N_{sync}$ is less than a predetermined threshold level (see FIGS. 5A and 5B). According to an embodiment, when the CH does not receive a request for the channel scan from its child devices for a long period of time, it determines that the channel scan is not required and data communication is performed well, and it may increase the time interval of the DATA interval by reducing the number $N_{sync}$. Also, according to an embodiment, when the CH does not receive a request for the channel scan from its child devices for a long period of time, it determines that the channel scan is not required and the number of data signals being exchanged is small, and it may decrease the time interval of the DATA interval by increasing the number $N_{sync}$, thereby improving synchronization performance of its child devices.

Processes of repeatedly exchanging, by network devices in the cluster network, the synchronization signal in operation 304, according to an embodiment, are as follows. The CH repeatedly transmits the synchronization signal $N_{sync}$ times determined in operation 303 in the next transmission frame (refer to FIGS. 6A, 6B, and 6C). Here, an $i^{th}$ synchronization signal includes the number $N_{sync}$, a time duration of a synchronization signal, referred to $T_{beacon}$, and the number i, where $1 \leq i \leq N_{sync}$. The child device can adjust a starting time of DATA interval by using information in the received synchronization signal as in Equation 8.

$$T_{offset}(i) = (N_{sync} - i)(T_{beacon} + T_{ISS})$$ [Equation 8]

Figure 6A:
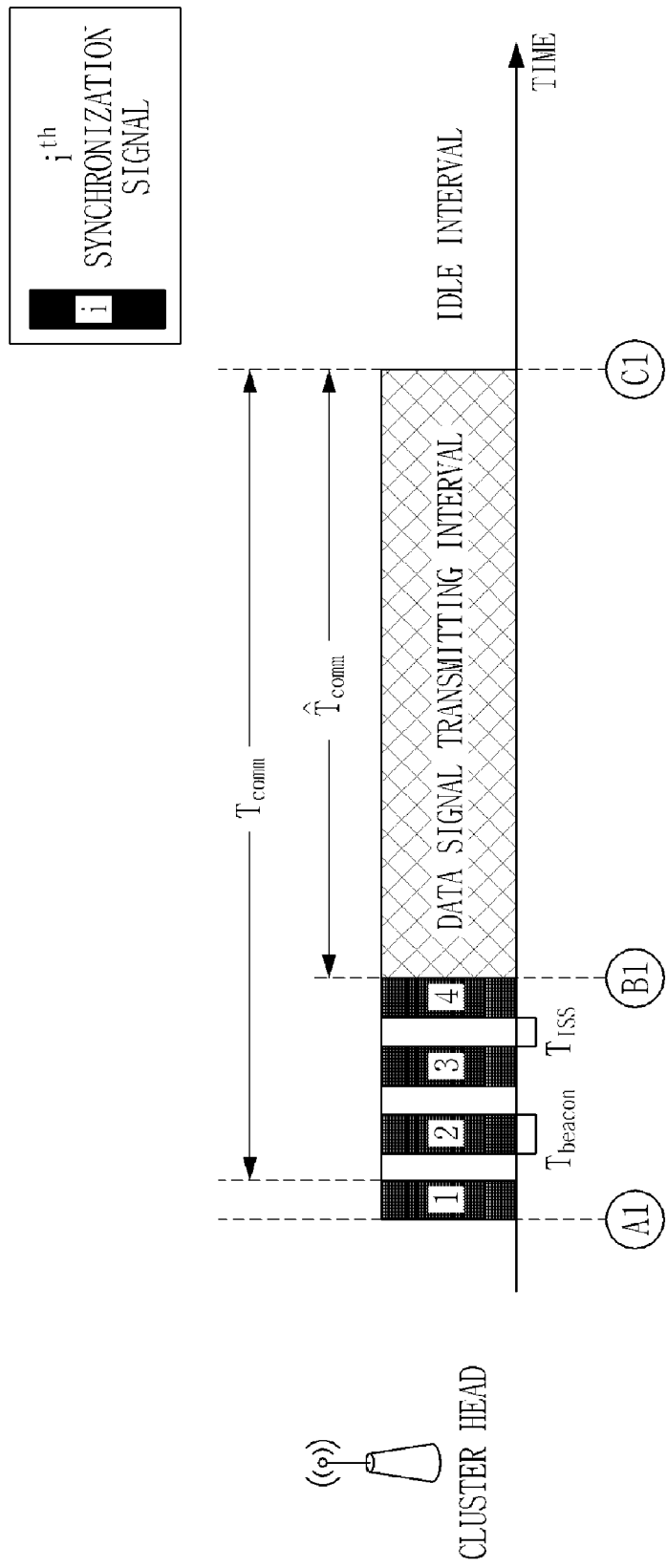

For example, when i=1 and $N_{sync}$=4 in a synchronization signal received by the child device, the synchronization signal will be transmitted three more times, and thus the child device begins its transmission of a data signal after waiting for a time interval of $3(T_{beacon} + T_{ISS})$, i.e., after its CH completes the transmission of the synchronization signal $N_{sync}$ times, so as not to interfere with signal reception of other child devices (refer to FIGS. 6A, 6B, and 6C).

One or more embodiments of the present invention are related to a technique of determining whether a channel scan is required, a technique of determining a channel scan interval, a technique of estimating characteristics of interference signal, a technique of determining the number of repeated transmissions of the synchronization signal, and a technique of repeatedly exchanging the synchronization signal in a cluster-tree structured wireless communication system, in which a signal is transmitted by using a periodic transmission frame comprising a SYNC interval, a DATA interval and an IDLE interval. According to the present invention, a network synchronization performance may stably be maintained even in the presence of plural interference sources by repeatedly transmitting the synchronization signal. Also, since only a CH performs the channel scan, power consumption of network devices may significantly be reduced compared to a conventional method, and power consumption of the CH may also be reduced since the CH may adjust the number of repeated transmissions of the synchronization signal without performing the channel scan.

Although preferred embodiments of the present invention have been described for illustrative purposes, those skilled in the art will appreciate that various modifications, additions and substitutions are possible, without departing from the scope and spirit of the invention as disclosed in the accompanying claims. Therefore, the embodiments of the present invention are disclosed only for illustrative purposes and should not be construed as limiting the present invention.

What is claimed is:

1. A signal transmission method in a wireless communication system comprising an access point (AP) that is a main communication device managing the wireless communication system, routers that can have their child devices, and end devices that cannot have their child devices, where the AP and each router may operate as a cluster head (CH), a CH and its child devices form a cluster network, the wireless communication system is formed in a multi-hop cluster-tree structure in which a plurality of the cluster networks are connected to each other in a tree structure, and the CH transmits a synchronization signal at the beginning of each transmission frame so as to transmit and receive a signal by using a periodic transmission frame comprising a synchronization signal transmitting interval, a data signal transmitting interval and an idle interval in which no signal is transmitted, the signal transmission method comprising:

determining, by the CH, whether a channel scan is required or not based on performance of signal transmission to and from its child devices;

when it is determined that the channel scan is required, estimating, by the CH, characteristics of interference signal by performing the channel scan in the idle interval and determining whether to use the same channel as being in use to transmit the synchronization signal or not; and depending on a decision whether the channel scan is required or not and the channel being in use is used or not, repeatedly transmitting, by the CH, the synchronization signal by taking into consideration of the performance of signal transmission to and from its child devices, the estimated characteristics of interference signal, and target transmission performance of the wireless communication system.

2. The signal transmission method of claim 1, wherein the determining of whether the channel scan is required comprises:

determining, by the CH, that the channel scan is required when transmission errors occur in signal transmission from its child devices more than a predetermined number of times or when the CH does not receive an acknowledgement (ACK) signal from its child device as a response to a successful signal transmission to the child device more than a predetermined number of times;

requesting, by the child devices, its CH to perform the channel scan when transmission errors occur in signal transmission from its CH more than a predetermined number of times or when the child device does not receive an ACK signal from its CH as a response to a successful signal transmission to the CH more than a predetermined number of times; and determining, by the CH, that the channel scan is required when it receives a request for the channel scan from its child device.

3. The signal transmission method of claim 1, wherein the estimating of the characteristics of interference signal and the determining of whether to use the same channel as being in use comprises:

estimating, by the CH, a ratio $\hat{\mu}(\equiv N_D/N_S)$ as a characteristic of interference signal when it detects the presence of interference signal $N_D$ times after repeatedly performing the channel sensing $N_S$ times in an idle interval in which none of cluster networks in the system transmits a signal; and determining, by the CH, to repeatedly transmit the synchronization signal through the same channel as being in use if it determines that the target transmission performance is achievable by using the same channel as being in use by taking into consideration of the estimated characteristic of interference signal and received signal strength, and to transmit the synchronization signal through a different channel if not.

4. The signal transmission method of claim 1, wherein the repeated transmission of the synchronization signal comprises:

when it is determined to use the same channel as being in use, determining, by the CH, the number of repeated transmissions of the synchronization signal, referred to $N_{sync}$, by a smallest integer n that yields a transmission failure rate of repeated n transmissions of the synchronization signal, referred to $\hat{p}_e(n,\hat{\mu})$, lower than a predetermined threshold level when the estimated characteristic of interference signal is $\hat{\mu}$;

when it is determined to change the channel, determining, by the CH, the number $N_{sync}$ by a smallest integer n that yields a transmission failure rate of repeated n transmissions of the synchronization signal through a channel being in use lower than a predetermined threshold level, or simply by a pre-fixed number $N_{sync}^{handoff}$ without any processing;

when it is determined that the channel scan is not required, if it successfully receives data signals from its child devices more than a predetermined number of times, increasing, by the CH, a counter $n_{good}$ by one, resetting $n_{good}$ to zero if $n_{good}$ equals to a predetermined threshold level, and decreasing the number $N_{sync}$ if $N_{sync}$ is larger than a predetermined threshold level, and if it successfully receives data signals from its child devices less than a predetermined number of times, increasing, by the CH, a counter $n_{bad}$ by one, resetting $n_{bad}$ to zero if $n_{bad}$ equals to a predetermined threshold level, and increasing the number $N_{sync}$ if $N_{sync}$ is less than a predetermined threshold level;

transmitting, by the CH, an $i^{th}$ synchronization signal including the number i, a time duration of a synchronization signal, referred to $T_{beacon}$, and the number $N_{sync}$, where $1 \leq i \leq N_{sync}$; and when a child device successfully receives the $i^{th}$ synchronization signal, beginning, by the child device, the transmission of a data signal after waiting for a time interval of $\hat{T}_{offset}=(N_{sync}-i)(T_{beacon}+T_{ISS})$ until its CH completes the transmission of the synchronization signal $N_{sync}$ times, where $T_{ISS}$ is a time interval between the two consecutive transmissions of the synchronization signal.

* * * * *